(12) United States Patent
Tan et al.

(10) Patent No.: US 8,788,744 B2
(45) Date of Patent: Jul. 22, 2014

(54) MEMORY CONTROL DEVICE

(75) Inventors: Shuang-Yi Tan, Hsinchu (TW);
Yueh-Yao Nain, Hsichu County (TW);
Der-Ing Hsu, Hsinchu County (TW)

(73) Assignee: Nuvoton Technology Corporation, Hsinchu Science Park (TW)

( * ) Notice: Subject to any disclaimer, the term of this patent is extended or adjusted under 35 U.S.C. 154(b) by 192 days.

(21) Appl. No.: 13/453,169

(22) Filed: Apr. 23, 2012

(65) Prior Publication Data
US 2013/0097363 A1 Apr. 18, 2013

(30) Foreign Application Priority Data
Oct. 13, 2011 (TW) .............................. 100137090 A

(51) Int. Cl.
*G06F 12/00* (2006.01)
*G06F 12/02* (2006.01)

(52) U.S. Cl.
CPC ................................ *G06F 12/0238* (2013.01)
USPC ........................................................ 711/103

(58) Field of Classification Search
CPC combination set(s) only.
See application file for complete search history.

(56) References Cited

U.S. PATENT DOCUMENTS

| | | |
|---|---|---|
| 2007/0271423 A1 | 11/2007 | Sung et al. |
| 2008/0122659 A1 | 5/2008 | Hou et al. |
| 2009/0070516 A1 | 3/2009 | Hou |
| 2009/0276561 A1 * | 11/2009 | Pekny et al. ................... 711/103 |
| 2010/0257300 A1 | 10/2010 | Hou |

FOREIGN PATENT DOCUMENTS

| | | |
|---|---|---|
| JP | 07-129500 A | 5/1995 |
| JP | 2001-167049 A | 6/2001 |
| JP | 2004-199374 A | 7/2004 |
| JP | 2004-326215 A | 11/2004 |
| JP | 2008-181442 A | 8/2008 |
| JP | 2012-190195 A | 10/2012 |
| TW | 200941277 A1 | 10/2009 |
| TW | I350451 | 10/2011 |
| WO | WO2010/076600 A1 | 7/2010 |

* cited by examiner

*Primary Examiner* — Brian Peugh
(74) *Attorney, Agent, or Firm* — Muncy, Geissler, Olds & Lowe, P.C.

(57) ABSTRACT

A memory control device for controlling a primary controller and a secondary controller to access a flash memory is provided. A bus switch is coupled to the primary controller, the secondary controller and the flash memory via a first, second and third serial peripheral interface (SPI) buses, respectively. A selecting unit selectively couples the third SPI bus to one of the first and second buses. When the bus switch receives an access request from the primary controller via the first SPI bus, the selecting unit couples the third SPI bus to the first SPI bus, so as to transmit a chip select signal, a clock signal and a master output slave input (MOSI) signal from the primary controller to the flash memory for accessing the flash memory. The first access request is provided by the first chip select signal.

20 Claims, 7 Drawing Sheets

US 8,788,744 B2

MEMORY CONTROL DEVICE

CROSS REFERENCE TO RELATED APPLICATIONS

This Application claims priority of Taiwan Patent Application No. 100137090, filed on Oct. 13, 2011, the entirety of which are incorporated by reference herein.

BACKGROUND OF THE INVENTION

1. Field of the Invention

The invention relates to a memory control device, and more particularly to a memory control device for a serial peripheral interface (SPI) flash memory.

2. Description of the Related Art

Flash memories are commonly used components on main boards of the computers, and are widely applied in personal computers and notebook computers. Various kinds of data may be stored in the flash memory, and therefore a chipset and other peripheral integrated circuits (ICs) may complete instructions of users by accessing data stored in the flash memory.

Nowadays, the data that most of the computer systems are used to perform boot procedures, such as basic input/output system (BIOS), is stored in a flash memory of the computer systems. In a main board, data of the flash memory is accessed via an embedded controller. In general, an SPI is used to connect the embedded controller and the flash memory.

In a computer system, an SPI is an interface that permits serial data exchange between two devices (one is master and another is slave). The SPI interface is composed of four signals: a chip select (CS) signal, a clock signal, a master output slave input (MOSI) signal and a master input slave output (MISO) signal. When the chip select signal is activated, the SPI bus can perform data communication via the other three signals.

BRIEF SUMMARY OF THE INVENTION

Memory control devices are provided. An embodiment of a memory control device for controlling a primary controller and a secondary controller to access a flash memory is provided. The memory control device comprises: a bus switch coupled to the primary controller, the secondary controller and the flash memory via a first, second and third serial peripheral interface (SPI) buses, respectively. The bus switch comprises a selecting unit, selectively coupling the third SPI bus to one of the first and second buses. When the bus switch receives a first access request from the primary controller via the first SPI bus, the selecting unit couples the third SPI bus to the first SPI bus, so as to transmit a first chip select signal, a first clock signal and a first master output slave input (MOSI) signal from the primary controller to the flash memory for accessing the flash memory, wherein the first access request is provided by the first chip select signal.

Furthermore, another embodiment of a memory control device for controlling a primary controller and a secondary controller to access a flash memory is provided. The memory control device comprises: a bus switch coupled to the primary controller, the secondary controller and the flash memory via a first, second and third serial peripheral interface (SPI) buses, respectively, selectively coupling the third SPI bus to one of the first and second buses, wherein the primary controller accesses the flash memory when the third SPI bus is coupled to the first SPI bus; a bus share regulation unit, determining whether the secondary controller is waiting to access the flash memory and counting a wait time when the flash memory is accessed by the primary controller; and, an interrupt unit, sending an interrupt request to the primary controller when the wait time exceeds a specific time. The primary controller stops accessing the flash memory in response to the interrupt request.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
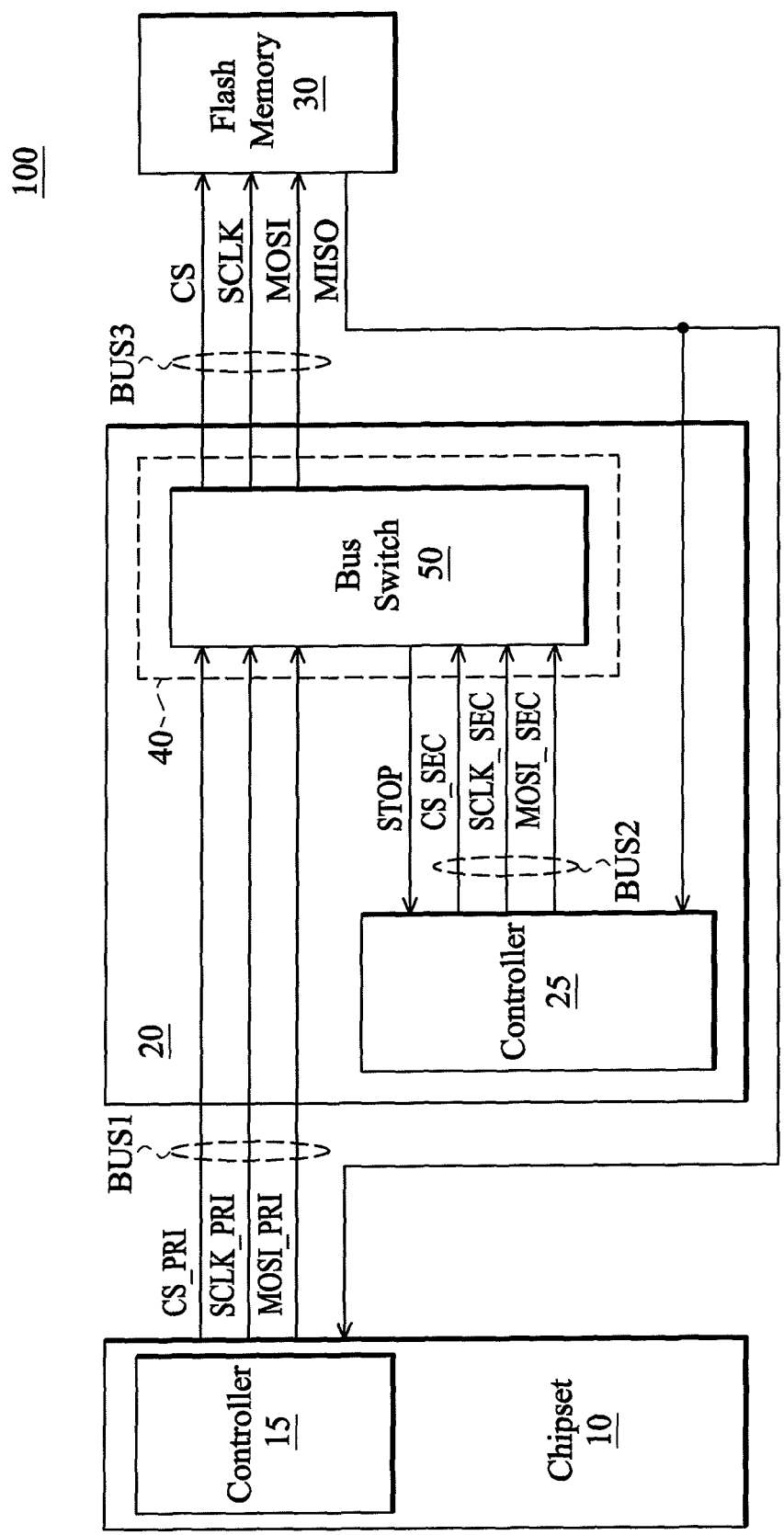
FIG. 1 shows a computer system that uses a memory control device according to an embodiment of the invention.

FIG. 1 shows a computer system 100 that uses a memory control device according to an embodiment of the invention. The computer system 100 comprises a chipset 10, a super input/output (super I/O) integrated circuit (IC) 20 and a flash memory 30. In FIG. 1, the flash memory 30 is a serial peripheral interface (SPI) flash memory. Therefore, both the chipset 10 and the super I/O IC 20 use the buses that conform to the SPI standard to connect/couple the flash memory 30. The chipset 10 comprises a controller 15 for accessing the flash memory 30, for example, accessing a bias input/output system (BIOS). The super I/O IC 20 comprises a controller 25 for accessing the flash memory 30, for example, accessing a read only memory (ROM) code. In general, the chipset 10 must access the flash memory 30 immediately, and the flash memory 30 must be shared between the super I/O IC 20 and the chipset 10. Therefore, in the embodiment, the controllers 15 and 25 are masters and the flash memory is a slave. Furthermore, access priority of the chipset 10 is higher than that of the super I/O IC 20 for the flash memory 30. Therefore, the controllers 15 and 25 function as a primary controller and a secondary controller, respectively.

In FIG. 1, the super I/O IC 20 further comprises a memory control unit 40 comprising a bus switch 50. The bus switch 50 can receive a chip select signal CS_PRI, a clock signal SCLK_PRI and a master output slave input (MOSI) signal MOSI_PRI from the controller 15 via a bus BUS1. In addition, the bus switch 50 also receives a chip select signal CS_SEC, a clock signal SCLK_SEC and a MOSI signal MOSI_SEC from the controller 25 via a bus BUS2. Next, the bus switch 50 couples the bus BUS3 to the bus BUS1 or BUS2 according to the chip select signal CS_PRI or CS_SEC, so as to transmit the signals from the controller 15 or 25 to the flash memory 30 via the bus BUS3. For example, if the controller 15 wants to access the flash memory 30, the controller 15 sends an access request to the bus switch 50 through the chip select signal CS_PRI, and then the bus switch 50 couples the bus BUS3 to the bus BUS1 and sends a stop signal STOP to the controller 25. When the controller 15 completes access of the flash memory 30 and the controller 25 sends an access request to the bus switch 50 through the chip select signal CS_SEC, the bus switch 50 couples the bus BUS3 to the bus BUS2, such that the controller 25 can access the flash memory 30. In general, a master can transmit the information regarding commands, addresses and data to a slave via a MOSI signal. For example, in a writing operation, the controller 15 transmits the command information CMD, the address information ADD and the data information DAT to the flash memory 30 through the MOSI signal MOSI_PRI in sequence, so as to write the data DAT into the address ADD of the flash memory 30. Furthermore, in a reading operation, the controller 15 transmits the command information CMD and the address information ADD to the flash memory 30 through the MOSI signal MOSI_PRI in sequence, so as to read the data stored in the address ADD of the flash memory 30. It is to be noted that the master input slave output (MISO) signals of the controllers 15 and 25 are directly provided by the flash memory 30, and do not pass through the buses BUS1, BUS2 and BUS3.

Figure 2:
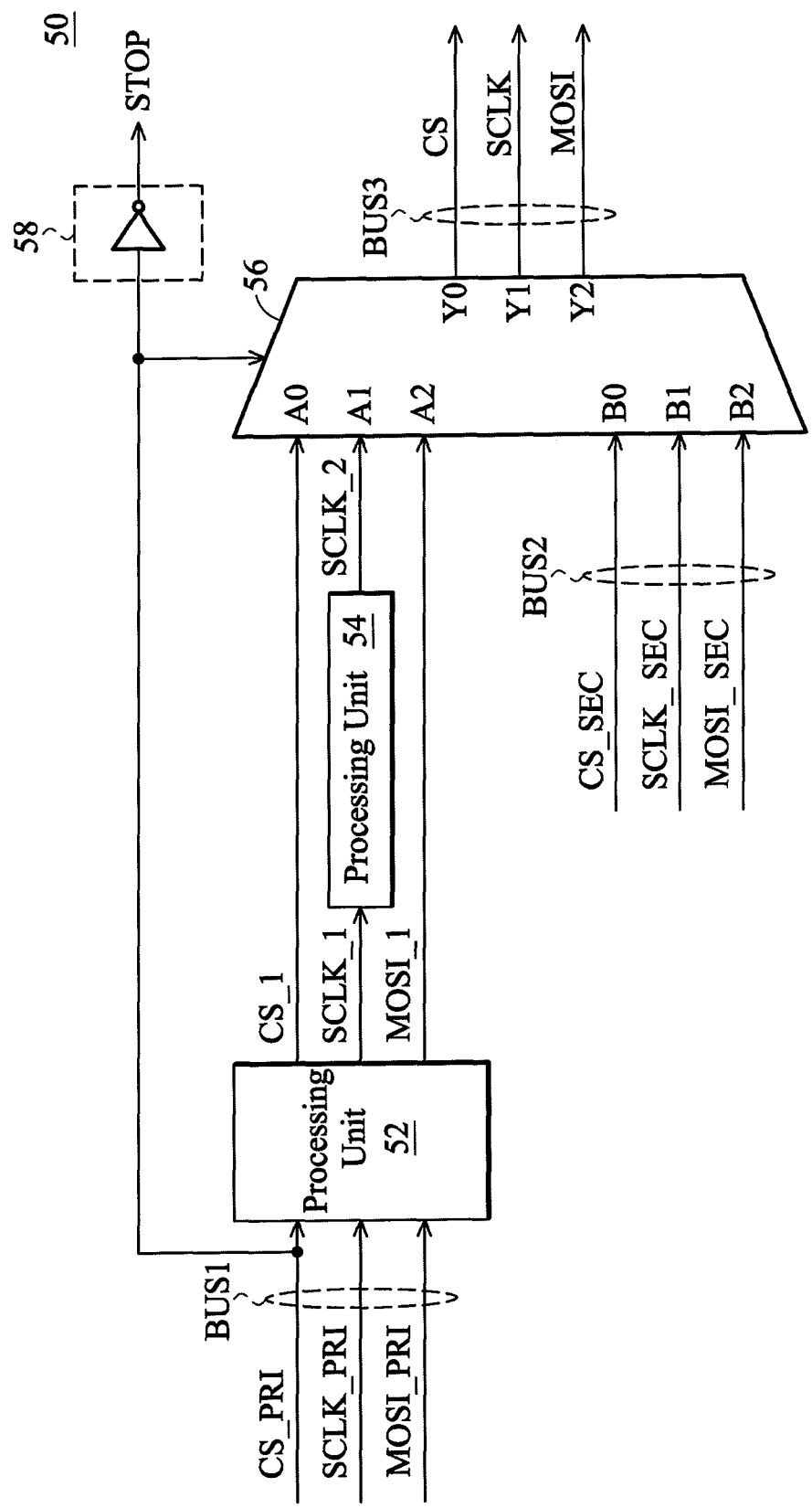
FIG. 2 shows a bus switch according to an embodiment of the invention.

FIG. 2 shows a bus switch 50 according to an embodiment of the invention. The bus switch 50 comprises a processing unit 52, a processing unit 54, a selecting unit 56 and a processing unit 58. Referring to FIG. 1 and FIG. 2 together, when the bus switch 50 receives the access request from the controller 15, the processing unit 52 adjusts the timing of the chip select signal CS_PRI, the clock signal SCLK_PRI and the MOSI signal MOSI_PRI, to generate the signals CS_1, SCLK_1 and MOSI_1, respectively. Next, the processing unit 54 further adjusts a duty cycle of the signal SCLK_1 to generate a signal SCLK_2. Next, according to the chip select signal CS_PRI, the selecting unit 56 provides the signals CS_1, SCLK_2 and MOSI_1 to the bus BUS3, as a chip select signal CS, a clock signal SCLK and a MOSI signal MOSI that are to be transmitted to the flash memory 30. In the embodiment, the selecting unit 56 is a multiplexer. Therefore, according to the received signals, the selecting unit 56 can couple a first set of input terminals A0-A2 or a second set of input terminals B0-B2 to the output terminals Y0-Y2 for output. Moreover, the processing unit 58 further provides a stop signal STOP to the controller 25 according to the chip select signal CS_PRI. In the embodiment, the processing unit 58 is an inverter.

Figure 3:
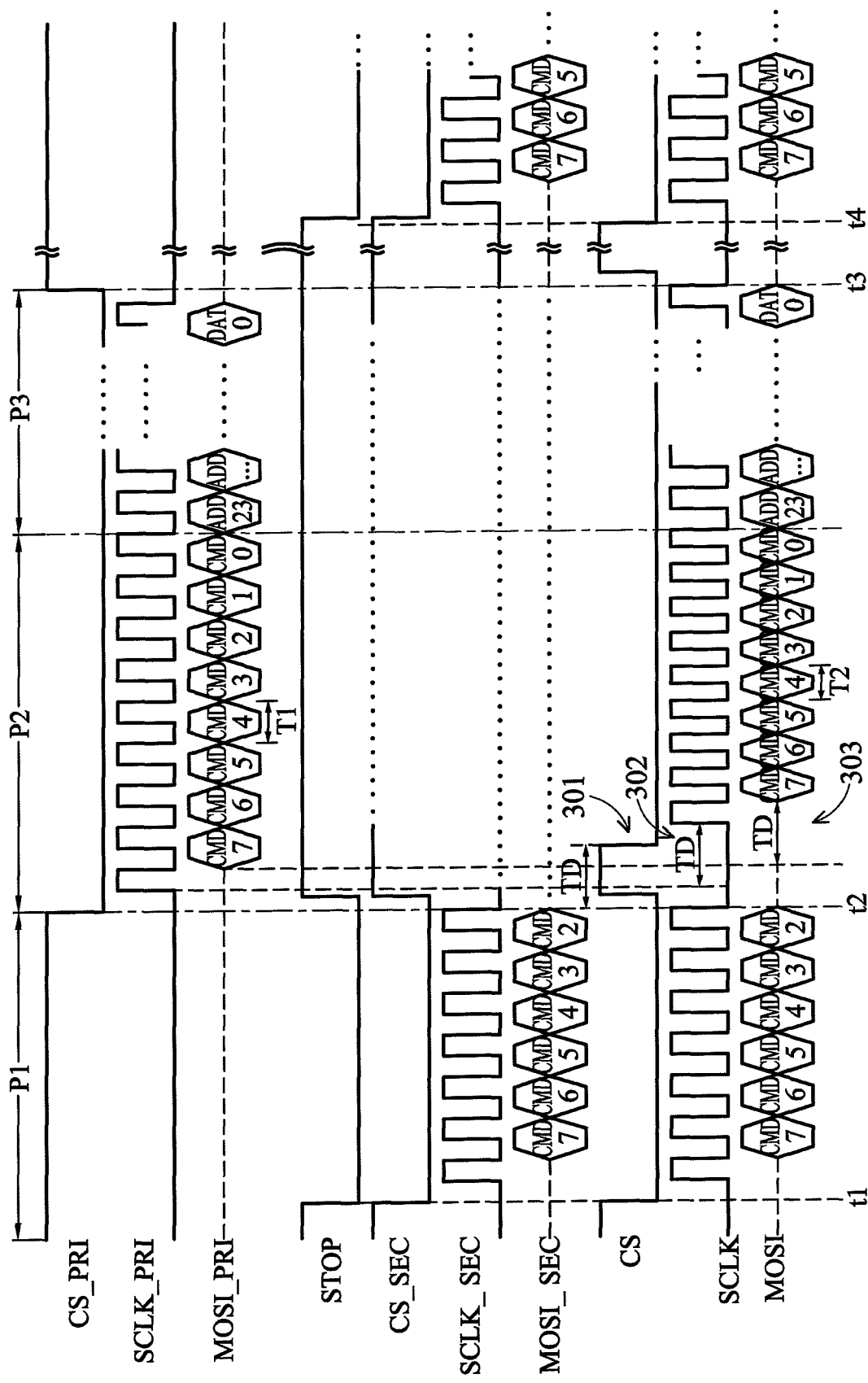
FIG. 3 shows a waveform diagram illustrating the signals of the bus switch of FIG. 2.

FIG. 3 shows a waveform diagram illustrating the signals of the bus switch 50 of FIG. 2. FIG. 3 is an example and does not limit the invention. In FIG. 3, the chip select signal CS_PRI or CS_SEC is at a low logic level when the chipset 10 or the super I/O IC 20 sends an access request. Furthermore, the MOSI signal MOSI_PRI or MOSI_SEC transmits the command information CMD, the address information ADD and the data information DAT from a most significant bit (MSB) to a least significant bit (LSB). Referring to FIG. 1 and FIG. 3 together, first, in a period P1, the chip select signal CS_PRI from the controller 15 is at a high logic level. Therefore, the chipset 10 does not access the flash memory 30. At a time point t1, the chip select signal CS_SEC from the controller 25 becomes a low logic level from a high logic level. Thus, the bus switch 50 couples the bus BUS3 to the bus BUS2, such that the controller 25 can access the flash memory 30. Next, the controller 25 transmits the clock signal SCLK_SEC and the MOSI signal MOSI_SEC to the flash memory 30. When the command information CMD is being transmitted by the controller 25, the controller 15 pulls the chip select signal CS_PRI to a low logic level at a time point t2. Thus, the processing unit 58 sends the stop signal STOP to the controller 25, and the bus switch 50 couples the bus BUS3 to the bus BUS1, such that the controller 15 can access the flash memory 30. In the embodiment, the processing unit 52 delays the chip select signal CS_PRI for a specific time TD, and then transmits the delayed signal to the flash memory 30, wherein the specific time TD needs to conform timing specifications of the flash memory 30. Similarly, the processing unit 52 also delays the clock signal SCLK_PRI and the MOSI signal MOSI_PRI for the specific time TD, and then transmits the delayed signals to the flash memory 30. For example, compared to the chip select signal CS_PRI, the bus switch 50 delays the specific time TD to change the chip select signal CS that is to be transmitted to the flash memory 30, from a high logic level to a low logic level, as shown by the arrowhead 301. For the flash memory 30, a timing violation is avoided by delaying the specific time TD. Furthermore, compared to the clock signal SCLK_PRI and the MOSI signal MOSI_PRI, the bus switch 50 delays the specific time TD to transmit the clock signal SCLK and the MOSI signal MOSI to the flash memory 30, as shown by the arrowheads 302 and 303, respectively.

It is to be noted that the processing unit 52 delays the clock signal SCLK_PRI and the MOSI signal MOSI_PRI in the arrowheads 302 and 303. However, when receiving the common information CMD of the MOSI signal MOSI_PRI, the processing unit 52 starts to adjust the timing of the clock signal SCLK_PRI and the MOSI signal MOSI_PRI corresponding to the command information CMD, such that the flash memory 30 can receive the address information ADD and the data information DAT synchronously. For example, the command information CMD comprises 8 bits CMD7 to CMD0. In the MOSI signal MOSI_PRI, a time period of each bit of the command information CMD is T1. In order for the address information ADD and the data information DAT transmitted to the flash memory 30 (i.e. the MOSI signal MOSI) to synchronize the address information ADD and the data information DAT provided by the controller 15 (i.e. the MOSI signal MOSI_PRI), the processing unit 52 may compensate the command information CMD for the delayed specific time TD, i.e. the processing unit 52 speeds up the transmission of command information CMD through the clock signal SCLK and the MOSI signal MOSI of the bus BUS3. In other words, in the MOSI signal MOSI, a time period T2 of each bit of the command information CMD is smaller than the time period T1. In the embodiment, the delayed specific time TD is compensated by each bit of the command information CMD averagely, so T2=T1−TD/8. Therefore, in a time period P3, the clock signal SCLK and the MOSI signal MOSI on the bus BUS3 will synchronize the clock signal SCLK_PRI and the MOSI signal MOSI_PRI on the bus BUS1. Next, at a time point t3, the chip select signal CS_PRI from the controller 15 is changed from a high logic level to a low logic level, thereby the controller 15 completes the access of the flash memory 30. Next, at a time point t4, the controller 25 controls the chip select signal CS_SEC from a high logic level to a low logic level, to send an access request to the flash memory 30. Because the controller 15 stops accessing the flash memory 30, the bus switch 50 couples the bus BUS3 to the bus BUS2. Next, the controller 25 can transmit the clock signal SCLK_SEC and the MOSI signal MOSI_SEC to the flash memory 30 to access the flash memory.

Figure 4:
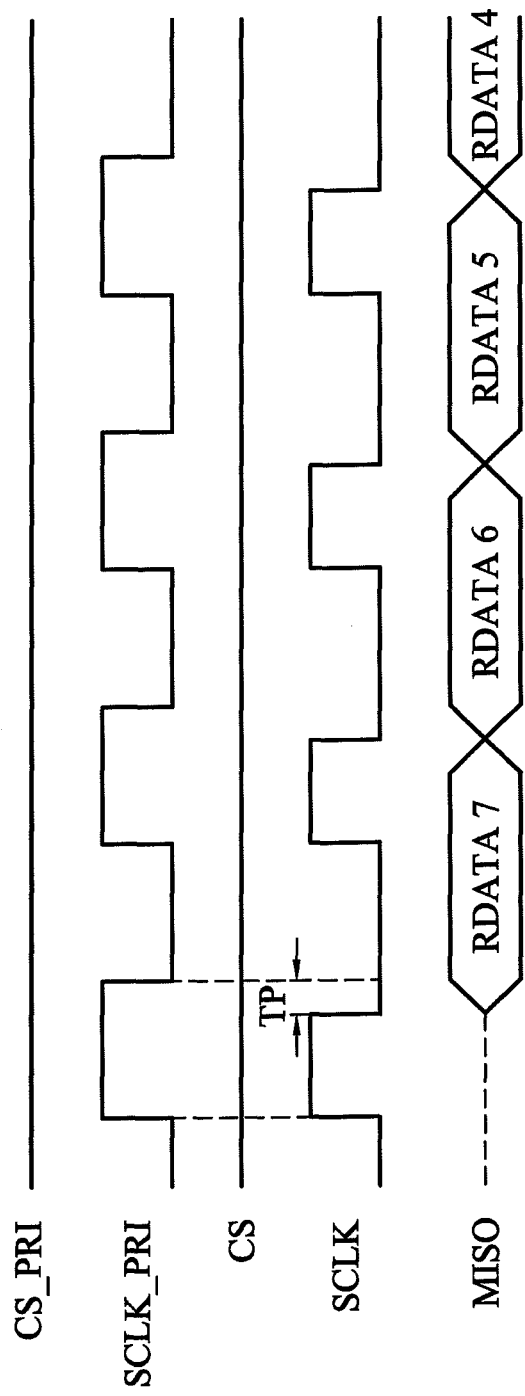
FIG. 4 shows another waveform diagram illustrating the signals of the bus switch of FIG. 2.

FIG. 4 shows another waveform diagram illustrating the signals of the bus switch 50 of FIG. 2, which describes a duty cycle of a clock signal adjusted by the processing unit 54. Referring to FIGS. 1, 2 and 4 together, when the controller 15 accesses the flash memory 30, the chip select signal CS_PRI from the controller 15 is at a low logic level. After the read command and the read address have been transmitted by the controller 15 through the MOSI signal MOSI_PRI, the flash memory 30 transmits the data stored in the read address to the controller 15 via the MISO signal MISO. In the embodiment, the flash memory 30 outputs the read data RDATA at a falling edge of the received clock signal. Therefore, the bus switch 50 also generates a rising edge of the clock signal SCLK to the flash memory 30 when receiving the rising edge of the clock signal SCLK_PRI. Next, the bus switch 50 generates a falling edge of the clock signal SCLK to the flash memory 30 in advance, such that the flash memory 30 pre-outputs the read data RDATA7, RDATA6, RDATA5, RDATA4 and so on, to the controller 15. As shown in FIG. 4, compared with the falling edge of the clock signal SCLK_PRI, the falling edge of the clock signal SCLK will be advanced by the time period TP, thus compensating for the input/output latency of the signals when the signals pass through the integrated circuit. Therefore, the chipset 10 can operate at a higher speed.

Figure 5:
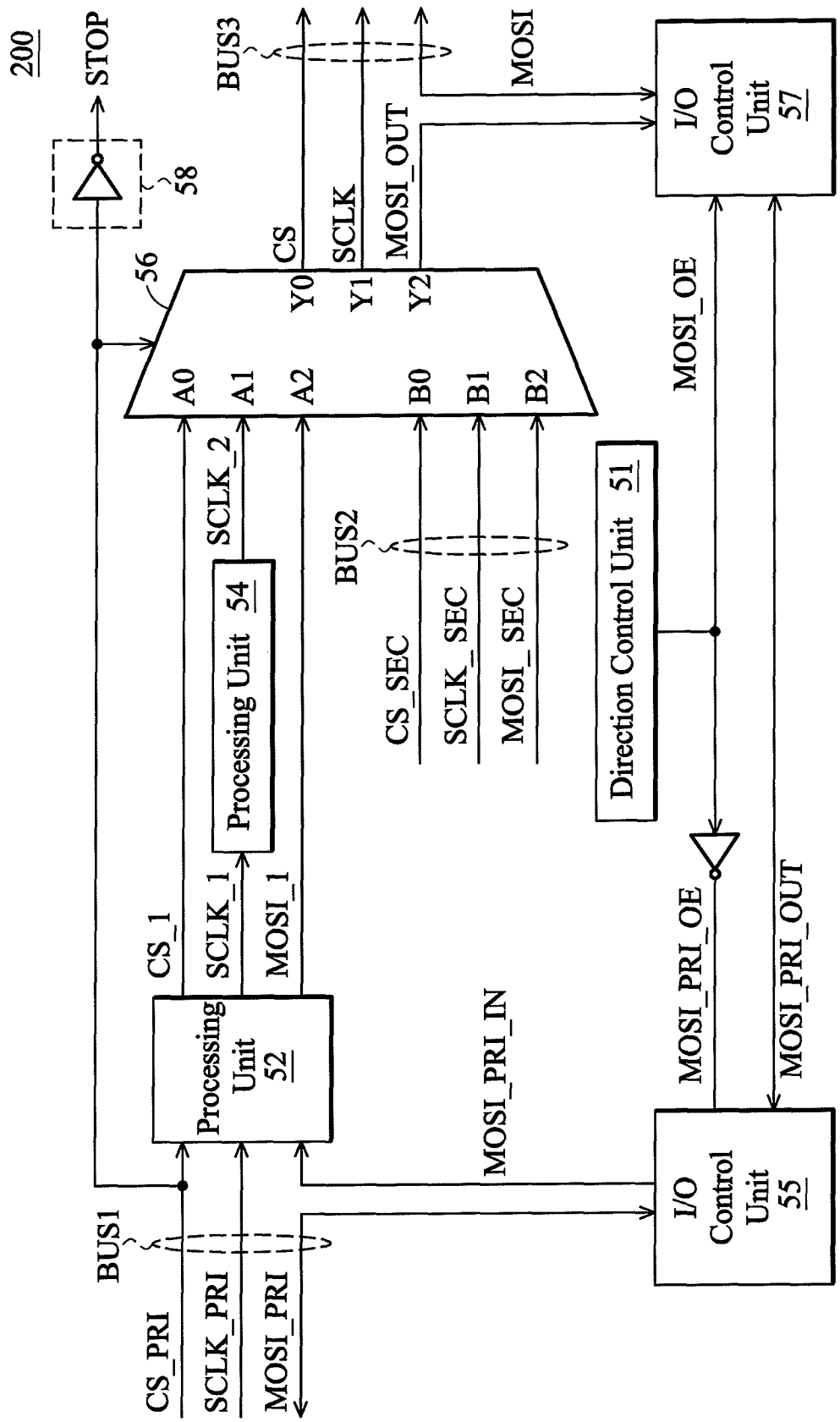
FIG. 5 shows a bus switch according to another embodiment of the invention.

FIG. 5 shows a bus switch 200 according to another embodiment of the invention. In the embodiment, the bus switch 200 can be applied to a multi-bit SPI flash memory, such as a dual-bit or quad-bit, so the MOSI signals and the MISO signals of the master and the slave are bi-direction signals. Compared to the bus switch 50, the bus switch 200 further comprises a direction control unit 51, an inverter 53 and the input/output (I/O) control units 55 and 57. The direction control unit 51 may be a decoder, which controls the transmitting directions of the MOSI signal MOSI of the bus BUS3 and the MOSI signal MOSI_PRI of the bus BUS1, and generates the signals MOSI_OE and MOSI_PRI_OE to control the I/O control units 55 and 57, so as to transmit the MOSI signal MOSI_PRI from the bus BUS1 to the bus BUS3 or transmit the MOSI signal MOSI from the bus BUS3 to the bus BUS1. For example, the I/O control unit 55 provides the signal MOSI_PRI_IN to the processing unit 52 according to the MOSI signal MOSI_PRI of the bus BUS1 under the control of the signal MOSI_PRI_OE, and the I/O control unit 57 provides the signal MOSI to the bus BUS3 according to an output signal MOSI_OUT of the selecting unit 56 under the control of the signal MOSI_OE, thus the signals from the chipset 10 are transmitted to the flash memory 30. On the contrary, the I/O control unit 57 provides the signal MOSI_PRI_OUT to the I/O control unit 55 according to the signal MOSI of the bus BUS3 under the control of the signal MOSI_OE, and the I/O control unit 55 provides the MOSI signal MOSI_PRI to the bus BUS1 according to the signal MOSI_PRI_OUT under the control of the signal MOSI_PRI_OE. Thus the signals from the flash memory 30 are transmitted to the chipset 10.

Figure 6:
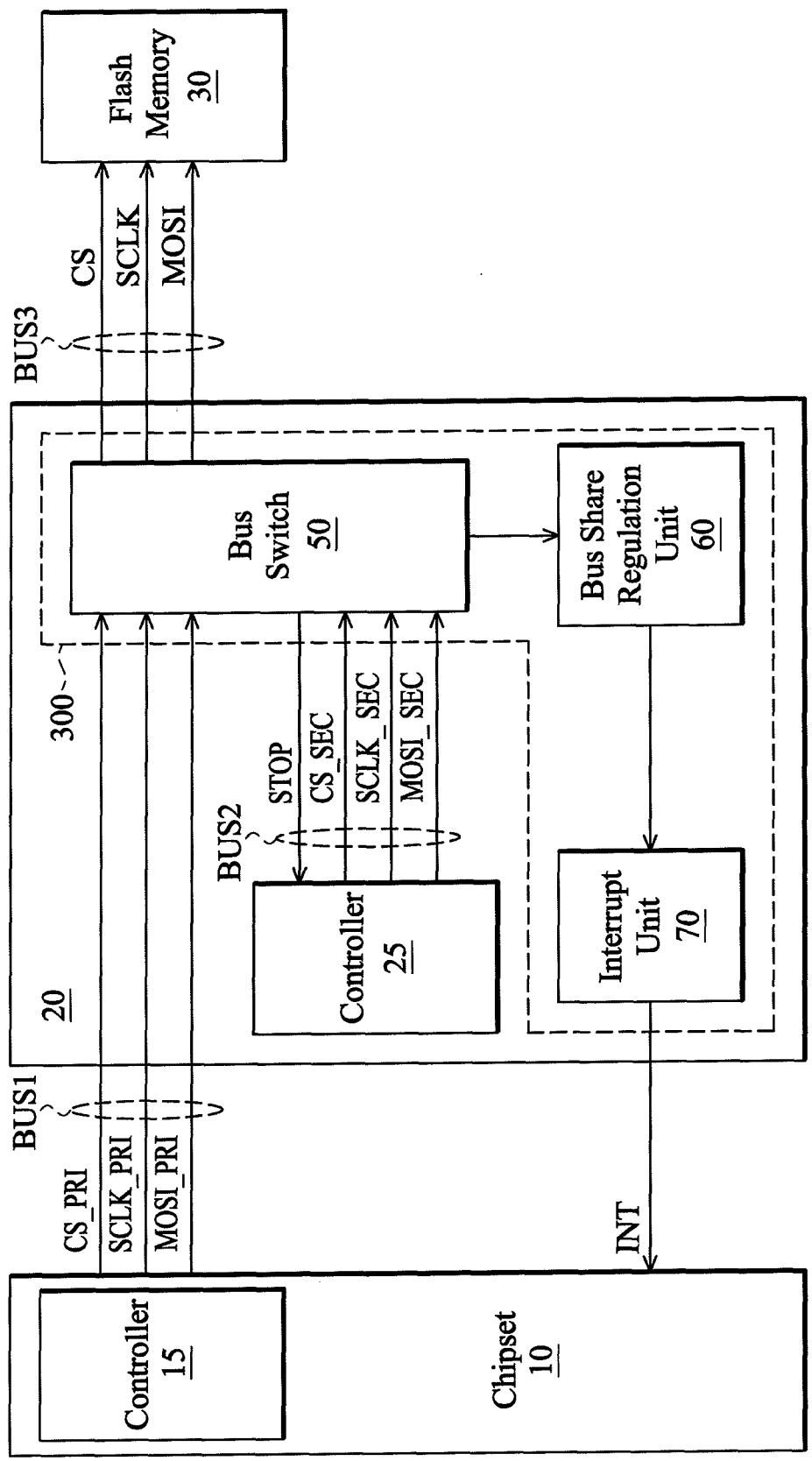
FIG. 6 shows a memory control unit according to another embodiment of the invention.

FIG. 6 shows a memory control unit 300 according to another embodiment of the invention. Compared with the memory control unit 40, the memory control unit 300 further comprises a bus share regulation unit 60 and an interrupt unit 70. In general, the chipset 10 does not access the flash memory 30 frequently in a normal operation. However, the chipset 10 may access the flash memory 30 continuously when incurring attacks caused by malicious software, so the super I/O IC 20 is unable to access the flash memory 30. In other words, the bus BUS3 is occupied by the bus BUS1. Therefore, when the super I/O IC 20 is waiting to access the flash memory 30, the bus share regulation unit 60 may count a wait time of the super I/O IC 20. If the wait time exceeds a predefined time, the bus share regulation unit 60 notifies the interrupt unit 70 to send an interrupt request INT to the chipset 10, to notify the chipset 10 to stop accessing the flash memory 30. After the chipset 10 stops accessing the flash memory 30, the memory control device 300 couples the bus BUS3 to the bus BUS2, thereby the super I/O IC 20 can access the flash memory 30. In addition, assuming that the wait time of the super I/O IC 20 counted by the bus share regulation unit 60 is Twait, the bus share regulation unit 60 sets an access time that the super I/O IC 20 can access the flash memory 30 to Twait (i.e. the wait time previously), to balance the times that the chipset 10 and the super I/O IC 20 use the flash memory 30. Next, when a time that the super I/O IC 20 accesses the flash memory 30, reaches the access time Twait, the bus share regulation unit 60 notifies the interrupt unit 70 to cancel the interrupt request INT. Thus, the chipset 10 can continue to access the flash memory 30. In one embodiment, a watch dog mechanism can also be used to send the interrupt request INT.

Figure 7:
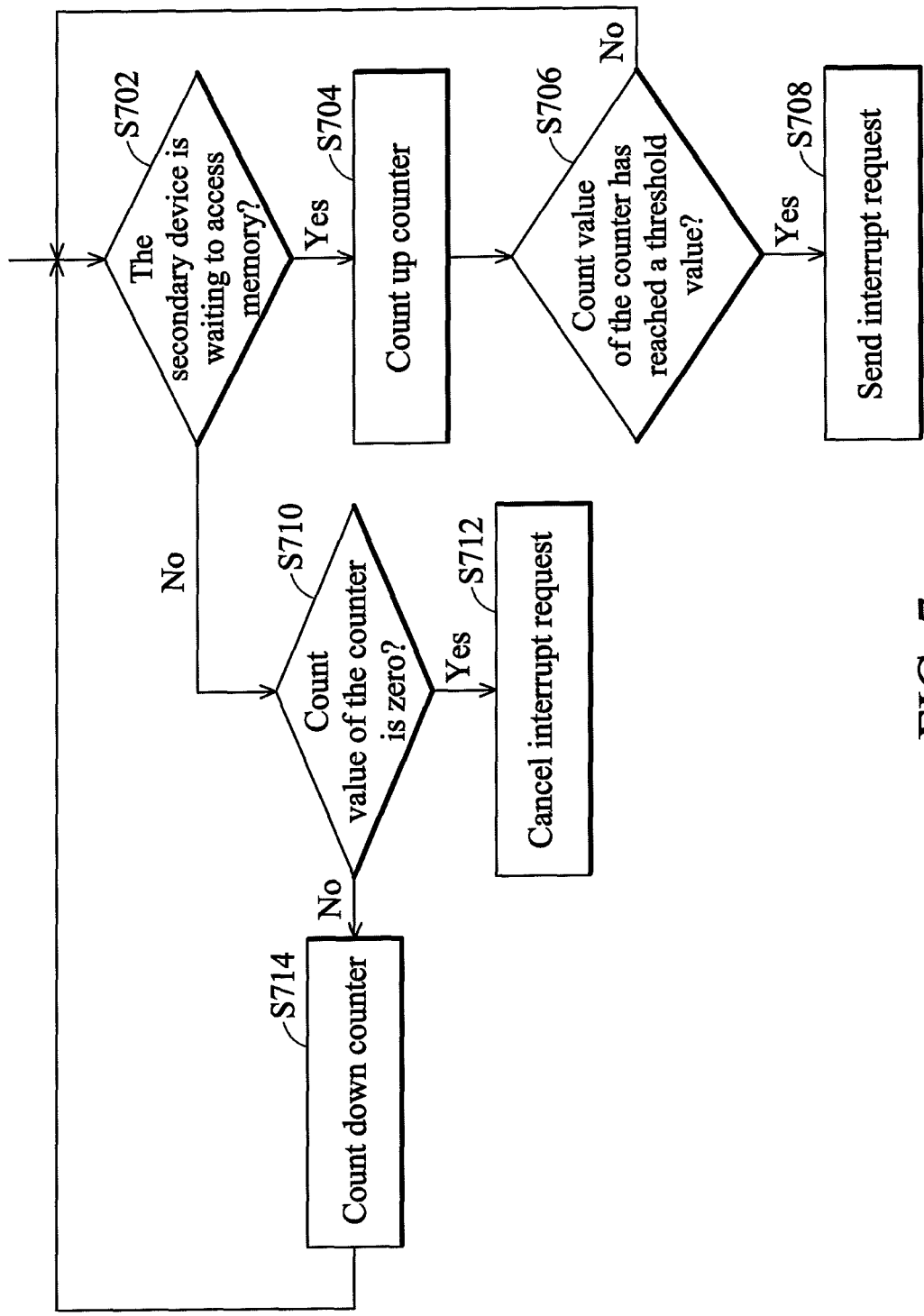
FIG. 7 shows a bus share regulation method for a memory control device according to an embodiment of the invention.

FIG. 7 shows a bus share regulation method for a memory control device (e.g. 300 of FIG. 6) according to an embodiment of the invention. The memory control device is coupled to a slave and a plurality of masters via SPI buses. The masters comprise a primary device (e.g. the chipset 10 of FIG. 6) and at least one secondary device (e.g. the super I/O IC 20 of FIG. 6), and the slave is a memory (e.g. the flash memory 30 of FIG. 6). First, in step S702, it is determined whether the secondary device is waiting to access the memory, i.e. the memory is presently being accessed by the primary device. If yes, a counter is counted up (step S704), for example adding one to the count value of the counter. Next, in step S706, it is determined whether the count value has reached a threshold value. If yes, an interrupt request is sent to the primary device (step S708), such that the primary device stops accessing the memory, thereby the secondary device can access the memory. If no, step S702 is performed. Therefore, if the primary device continuously accesses the memory, e.g. the malicious software described above, the count value will reach the threshold value. Thus, the primary device can stop accessing the memory so that the secondary device can access the memory. On the contrary, it is determined whether the count value is zero (step S710) when it is determined that the secondary device is not waiting to access the memory in step S702. If no, the counter is counted down (step S714), for example one is subtracted from the count value of the counter. If yes, the interrupt request that was sent before, is canceled (step S712), such that the primary device can continue to use the memory. Therefore, a wait time of the secondary device can be compensated by counting up and down the count value of the counter. For example, assuming that the threshold value is 30, the interrupt request will be sent to the primary device when the count value of the counter is counted to 30. However, after receiving the interrupt request, the primary device must complete the current data access of the memory, and then releases the memory to the secondary device. Therefore, when the secondary device starts to access the memory, the count value of the counter may be counted to 50, i.e. a time that the secondary device has really waited. Therefore, the count value of the counter must count down to 0 from 50 when steps S710, S712 and S714 are being performed, and then the interrupt request will be canceled. Thus, the previous wait time can be compensated.

FIG. 1 and FIG. 6 are one example and do not limit the invention. In FIG. 1 and FIG. 6, the chipset 10, the super I/O IC 20 and the flash memory 30 are separated chips. But the super I/O IC 20 can be integrated into a chip of the chipset 20, or integrated into the flash memory 30 in the invention.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A memory control device for controlling a primary controller and a secondary controller to access a flash memory, comprising:
    a bus switch coupled to the primary controller, the secondary controller and the flash memory via a first, second and third serial peripheral interface (SPI) buses, respectively, comprising:
        a selecting unit, selectively coupling the third SPI bus to one of the first and second buses,
    wherein when the bus switch receives a first access request from the primary controller via the first SPI bus, the selecting unit couples the third SPI bus to the first SPI bus, so as to transmit a first chip select signal, a first clock signal and a first master output slave input (MOSI) signal from the primary controller to the flash memory for accessing the flash memory, wherein the first access request is provided by the first chip select signal.

2. The memory control device as claimed in claim 1, wherein when the first chip select signal indicates that the first access request of the primary controller has been completed and the bus switch receives a second access request from the secondary controller via the second SPI bus, the selecting unit couples the third SPI bus to the second SPI bus, so as to transmit a second chip select signal, a second clock signal and a second MOSI signal from the secondary controller to the flash memory for accessing the flash memory.

3. The memory control device as claimed in claim 1, wherein a first master input slave output (MISO) signal of the primary controller and a second MISO signal of the secondary controller are directly provided by an output signal of the flash memory without passing through the first, second and third SPI buses.

4. The memory control device as claimed in claim 1, wherein the first MOSI signal comprises command information and address information, and the bus switch further comprises:
    a first processing unit coupled between the first SPI bus and the selecting unit, delaying the first chip select signal, the first clock signal and the first MOSI signal and adjusting the timing of the first MOSI signal and the first clock signal corresponding to the command information when the first access request from the primary controller is received via the first SPI bus, such that timing of the first MOSI signal and the first clock signal corresponding to the address information from the first processing unit to the flash memory synchronize to the timing of the first MOSI signal and the first clock signal corresponding to the address information from the primary controller to the first processing unit.

5. The memory control device as claimed in claim 4, further comprising:
    a second processing unit coupled between the first processing unit and the selecting unit, adjusting a duty cycle of the first clock signal to be transmitted to the selecting unit.

6. The memory control device as claimed in claim 1, wherein when the bus switch receives the first access request from the primary controller via the first SPI bus, the bus switch further sends a stop signal to the secondary controller, so as to notify the secondary controller to stop accessing the flash memory.

7. The memory control device as claimed in claim 1, further comprising:
    a bus share regulation unit, determining whether the secondary controller is waiting to access the flash memory and counting a wait time when the flash memory is accessed by the primary controller; and
    an interrupt unit, sending an interrupt request to the primary controller when the wait time exceeds a specific time,
    wherein the primary controller stops accessing the flash memory in response to the interrupt request.

8. The memory control device as claimed in claim 7, wherein when the first chip select signal indicates that the primary controller has stopped accessing the flash memory, the selecting unit of the bus switch couples the third SPI bus to the second SPI bus, so as to transmit a second chip select signal, a second clock signal and a second MOSI signal from the secondary controller to the flash memory for accessing the flash memory.

9. The memory control device as claimed in claim 8, wherein when the selecting unit couples the third SPI bus to the second SPI bus, the bus share regulation unit sets the counted wait time as an access time, and the interrupt unit stops sending the interrupt request to the primary controller when a time that the secondary controller accesses the flash memory, reaches the access time.

10. The memory control device as claimed in claim 1, wherein the primary controller is implemented in a chipset.

11. The memory control device as claimed in claim 1, wherein the memory control device and the primary controller are integrated into a chip of a chipset.

12. The memory control device as claimed in claim 1, wherein the memory control device and the secondary controller are implemented in a super input/output integrated circuit.

13. The memory control device as claimed in claim 1, wherein the memory control device and the flash memory are integrated into a chip.

14. A memory control device for controlling a primary controller and a secondary controller to access a flash memory, comprising:
    a bus switch coupled to the primary controller, the secondary controller and the flash memory via a first, second and third serial peripheral interface (SPI) buses, respectively, selectively coupling the third SPI bus to one of the first and second buses, wherein the primary controller accesses the flash memory when the third SPI bus is coupled to the first SPI bus;
    a bus share regulation unit, determining whether the secondary controller is waiting to access the flash memory and counting a wait time when the flash memory is accessed by the primary controller; and
    an interrupt unit, sending an interrupt request to the primary controller when the wait time exceeds a specific time;
    wherein the primary controller stops accessing the flash memory in response to the interrupt request.

15. The memory control device as claimed in claim 14, wherein when the primary controller has stopped accessing the flash memory, the bus switch couples the third SPI bus to the second SPI bus, such that the secondary controller accesses the flash memory.

16. The memory control device as claimed in claim 15, wherein when the bus switch couples the third SPI bus to the second SPI bus, the bus share regulation unit sets the counted wait time as an access time, and the interrupt unit stops sending the interrupt request to the primary controller when a time that the secondary controller accesses the flash memory, reaches the access time.

17. The memory control device as claimed in claim 14, wherein a first master input slave output (MISO) signal of the primary controller and a second MISO signal of the secondary controller are directly provided by an output signal of the flash memory without passing through the first, second and third SPI buses.

18. The memory control device as claimed in claim 14, wherein the primary controller is implemented in a chipset.

19. The memory control device as claimed in claim 14, wherein the memory control device and the secondary controller are implemented in a super input/output integrated circuit.

20. The memory control device as claimed in claim 14, wherein the memory control device and the primary controller are integrated into a chip of a chipset.

* * * * *